United States Patent
Kwon et al.

(10) Patent No.: US 9,478,318 B2
(45) Date of Patent: Oct. 25, 2016

(54) WATER-SPRAY RESIDUAL HEAT REMOVAL SYSTEM FOR NUCLEAR POWER PLANT

(75) Inventors: Tae Soon Kwon, Daejeon (KR); Chul Hwa Song, Daejeon (KR); Joon Eon Yang, Daegeon (KR); Won Pil Baek, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 731 days.

(21) Appl. No.: 13/614,898

(22) Filed: Sep. 13, 2012

(65) Prior Publication Data
US 2013/0202075 A1 Aug. 8, 2013

(30) Foreign Application Priority Data
Feb. 7, 2012 (KR) .................. 10-2012-0012218

(51) Int. Cl.
*G21C 15/18* (2006.01)
*G21C 19/28* (2006.01)
*G21D 1/02* (2006.01)

(52) U.S. Cl.
CPC .............. *G21C 15/18* (2013.01); *G21C 19/28* (2013.01); *G21D 1/02* (2013.01); *Y02E 30/40* (2013.01)

(58) Field of Classification Search
CPC ................................. G21C 15/18; F28D 3/00
USPC ................................................. 376/282, 299
See application file for complete search history.

(56) References Cited

U.S. PATENT DOCUMENTS

| 3,190,808 A | 6/1965 | Dodd |
| 3,890,787 A * | 6/1975 | Margen .................. F01K 9/003 236/49.1 |
| 4,057,465 A | 11/1977 | Thompson et al. |
| 4,753,771 A * | 6/1988 | Conway ................. G21C 15/18 376/282 |
| 4,765,946 A | 8/1988 | Dagard et al. |
| 2011/0158371 A1* | 6/2011 | Sato et al. .................... 376/249 |

FOREIGN PATENT DOCUMENTS

| EP | 2500908 A1 | 9/2012 |
| FR | 2584228 A1 | 1/1987 |
| JP | 10160885 A | 6/1998 |
| JP | 2000147181 | 5/2000 |
| JP | 2013076578 | 4/2013 |

OTHER PUBLICATIONS

French Preliminary Search Report for FR application 1258603 mailed Feb. 12, 2016.

* cited by examiner

*Primary Examiner* — Sean P Burke
(74) *Attorney, Agent, or Firm* — Polster, Lieder, Woodruff & Lucchesi, L.C.

(57) ABSTRACT

A residual heat removal system for a nuclear power plant. The residual heat removal system for a nuclear power plant may include an air duct provided on an outside of a reactor containment building, a heat exchanger disposed on an inside of the air duct, a first pipe to transfer, to the heat exchanger, steam generated in a steam generator disposed on an inside of the reactor containment building, and second pipe to transfer, to the steam generator, water condensation that is cooled and condensed in the heat exchanger, wherein the heat exchanger is air-cooled using outside air flowing inside of the air duct.

7 Claims, 5 Drawing Sheets

WATER-SPRAY RESIDUAL HEAT REMOVAL SYSTEM FOR NUCLEAR POWER PLANT

CROSS-REFERENCE TO RELATED APPLICATION

This application claims the benefit of Korean Patent Application No. 10-2012-0012218, filed on Feb. 7, 2012, in the Korean Intellectual Property Office, the disclosure of which is incorporated herein by reference.

BACKGROUND

1. Field of the Invention

The present invention relates to a water-spray residual heat removal system for a nuclear power plant, and more particularly, to a residual heat removal system corresponding to a hybrid of a water-spray system and an air cooling system that greatly extends an operating time by spraying a cooling water to a heat exchanger or submerging the heat exchanger in water so that a relatively great amount of heat is removed using a latent heat of water evaporation at an early phase of a nuclear accident at which time a relatively great amount of residual heat is released, and by removing a core residual heat using an air cooling at a late phase of the nuclear accident at which time a supply of cooling water is exhausted or a heat load is significantly decreased.

2. Description of the Related Art

A pressurized water reactor (PWR) may use a steam generator (SG) secondary heat removal system to cool a decay heat. A conventional steam generator (SG) secondary heat removal system may not provide an auxiliary feedwater to a steam generator when a power supply of a water feeding pump is lost, or a water source is depleted due to internal or external causes. When a large disaster such as the Fukushima nuclear accident occurs, it may be difficult to approach an accident site and thus, it may be difficult to separately provide a power source for a cooling system of a nuclear power plant, and it may be difficult to replenish a cooling water to a water tank containing the heat exchanger. In this instance, a core residual heat may not be removed for a relatively long period of time, for example, a period of several days.

That is, a conventional PWR passive auxiliary feedwater system is available to cool a reactor system when a heat exchanger is imbedded with water. Thus, an available cooling time may be limited by a duration of power supplying time and a water volume of cooling tank. When a relatively severe accident occurs in a nuclear power plant due to internal or external circumstances, reproviding a power source or a cooling water may be difficult due to a damaged road or radioactive fallout and thus, a residual heat removal may be stopped, thereby leaving a nuclear reactor susceptible to a critical risk.

Accordingly, a research needs to resolve the issues described above.

SUMMARY

An aspect of the present invention provides a residual heat removal system for a nuclear power plant that may cool a heat exchanger without a restriction on an operating time for cooling since the heat exchanger may be cooled by circulating air in an atmosphere in addition to water.

Another aspect of the present invention also provides a residual heat removal system for a nuclear power plant that may remove heat through use of a latent heat of water evaporation by spraying a cooling water to a heat exchanger or in a state in which the heat exchanger is submerged in a water tank at an early phase of a nuclear accident, and may be converted to an air cooling system at a later phase of the nuclear accident after eight hours from the accident initiation, that is, a residual heat level is relatively at low.

Still another aspect of the present invention also provides a residual heat removal system for a nuclear power plant that may cool a heat exchanger for a relatively long period of time without a restriction on time and without replenishing a supply of cooling water since the heat exchanger may be cooled through use of air in the atmosphere, and use of an alternating current (AC) power supply may be omitted.

Yet another aspect of the present invention also provides a residual heat removal system for a nuclear power plant that may be readily converted between an air cooling and a water cooling, and may have an enhanced safety through use of a method of blocking a leakage of a radioactive substance by closing valves at both ends of an air duct, and releasing the radioactive substance inside the air duct into a reactor containment building when a radiation leakage accident occurs due to a damaged heat exchanger tube.

According to an aspect of the present invention, there is provided a residual heat removal system for a nuclear power plant, the residual heat removal system including an air duct provided on an outside of a reactor containment building, a heat exchanger disposed on an inside of the air duct, a first pipe to transfer, to the heat exchanger, a steam generated in a steam generator disposed on an inside of the reactor containment building, and a second pipe to transfer, to the steam generator, condensation water that is cooled and condensed in the heat exchanger, wherein the heat exchanger is air-cooled using outside air flowing inside of the air duct.

The residual heat removal system may further include a cooling water supply module to supply a cooling water to the heat exchanger, wherein the heat exchanger is water-cooled by spraying the cooling water on the heat exchanger.

The air duct may include a first shut-off valve to selectively open and close one end of the air duct, wherein the heat exchanger is water-cooled by being submerged in a cooling water supplied from the cooling water supply module when the first shut-off valve is closed. The cooling water supply module may be located at a higher elevation when compared to the heat exchanger so as to supply the cooling water to the heat exchanger through use of a water head differential.

The cooling water supply module may include a water pipe to supply the cooling water, and a water pipe shut-off electric valve to open and close the water pipe, wherein a plurality of water pipe shut-off electric valves are provided.

The air duct may include a first shut-off valve and a second shut-off valve to selectively open and close both ends of the air duct, the first pipe and the second pipe may include a first opening and closing valve unit and a second opening and closing valve unit to selectively open and close the first pipe and the second pipe, respectively, and the air duct may be cut off from the outside air and the reactor containment building when the first shut-off valve, the second shut-off valve, the first opening and closing valve unit, and the second opening and closing valve unit are closed.

The residual heat removal system may further include a connection pipe disposed between the air duct and the reactor containment building, wherein the connection pipe may include a check valve and a safety valve so that a fluid inside the air duct may be released into the reactor containment building when the first shut-off valve, the second shut-off valve, the first opening and closing valve unit, and the second opening and closing valve unit are closed.

The first pipe and the second pipe may have a downward slope in a direction of the steam generator.

According to an embodiment of the present invention, it is possible to cool a heat exchanger without a restriction on an operating time for cooling since the heat exchanger may be cooled by circulating air in an atmosphere in addition to water.

According to another embodiment of the present invention, it is possible to remove heat through use of a latent heat of evaporated water by spraying a cooling water to a heat exchanger or in a state in which the heat exchanger is submerged in a water tank at an early phase of the nuclear accident after eight hours from the accident initiation, that is, a residual heat level is relatively at low.

According to still another embodiment of the present invention, it is possible to cool a heat exchanger for a relatively long period of time without a restriction on time and without replenishing a supply of cooling water since the heat exchanger may be cooled through use of an air, and an AC power supply may not be used for operation.

According to yet embodiment of the present invention, it is possible to readily convert between an air cooling system and a water cooling system, and have an enhanced safety through use of a method of blocking a linkage of a radioactive substance by closing valves at both ends of an air duct, and releasing the radioactive substance inside the air duct into a reactor containment building when a radiation leakage accident occurs due to a damaged heat exchanger tube.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DESCRIPTION OF THE PREFERRED EMBODIMENTS

Figure 1:
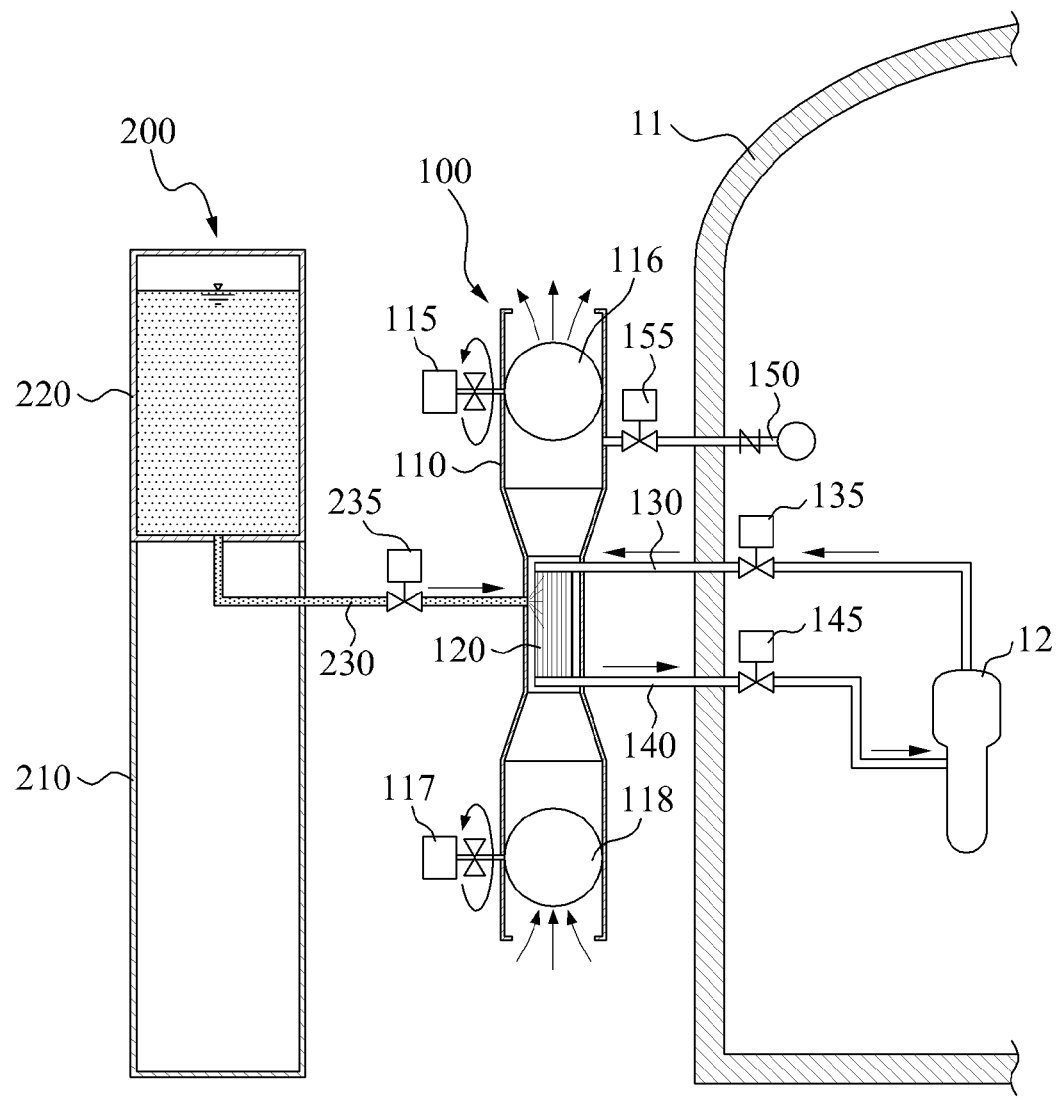
FIG. 1 illustrates a sectional view a residual heat removal system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a residual heat removal system according to an embodiment of the present invention. Referring to FIG. 1, a residual heat removal system 100 may include an air duct 110, a heat exchanger 120, a first pipe 130, and a second pipe 140.

A nuclear power generation system 10 may operate using a thermal cycle through a device such as a steam generator 12 disposed on an inside of a reactor containment building 11. In this instance, the heat exchanger 120 corresponding to an axis of the thermal cycle may be located on an inside of the air duct 110 that is disposed on an outside of the reactor containment building 11.

The steam generator 12 and the heat exchanger 120 may be connected through the first pipe 130 and the second pipe 140, and a refrigerant may be circulated to form the thermal cycle. The first pipe 130 and the second pipe 140 may include a first opening and closing valve unit 135 and a second opening and closing valve unit 145. When an error occurs in a nuclear power generation, the first pipe 130 and the second pipe 140 may be shut off by the first opening and closing valve unit 135 and the second opening and closing valve unit 145 so that a refrigerant may not flow freely between an inside and an outside of the reactor containment building 11. This arrangement will be described later with reference to FIG. 4.

In this instance, the first pipe 130 through which a fluid such as a refrigerant gas moves from the steam generator 12 to the heat exchanger 120 may be constructed to form an upward slope in a direction of the steam generator 12 so that the fluid may flow naturally. The second pipe 140 through which a fluid moves from the heat exchanger 120 to the steam generator 12 may be constructed to form a downward slope in a direction of the steam generator 120. That is, the first pipe 130 and the second pipe 140 may be disposed to be parallel to one another, and may be disposed so that the steam generator 120 may be located at a relatively higher elevation, and the fluid may naturally flow.

The air duct 110 may have a shape of a pipe, and may be formed in a shape of a Venturi tube in which a velocity of an air-flow increases at a portion of the steam generator 120 due to a reduced internal flow area. A first shut-off valve 118 and a second shut-off valve 116 may be provided on both sides of the air duct 110, and the first shut-off valve 118 and the second shut-off valve 116 may allow a flow of air in the air duct 110, and aid in performing water cooling by submerging the heat exchanger 120 in water 220 by closing one side of the air duct 110. Closing of the air duct 110 will be further described with reference to FIG. 2. Each of operating motors 117 and 115 may be attached to each of the first shut-off valve 118 and the second shut-off valve 116 to operate the first shut-off valve 118 and the second shut-off valve 116, respectively.

A cooling water supply module 200 may include a cooling water tank 210 and a cooling water 220 contained in the cooling water tank 210, and the cooling water 220 may spray the cooling water 220 to the heat exchanger 120 through being connected to the cooling water tank 210 via a water pipe 230, thereby cooling the heat exchanger 120 by using the cooling water 220. In this instance, a cooling effect may be doubled by the sprayed cooling water 220 and outside air flowing into the air duct 110. The air duct 110 may be filled with the cooling water 220 through the water pipe 230 to perform a cooling by way of a water cooling scheme.

The water pipe 230 may include a water pipe shutting-off electric valve 235 to control a flow of the cooling water 220. In this instance, a power source that provides power to the water pipe shut-off electric valve 235 may be constructed by a dedicated direct current (DC) battery, and a plurality of power sources may be constructed to secure safety by operating a spare power source when one of the plurality of power sources fails. A plurality of the water pipe shut-off electric valves may be provided in anticipation of a failure.

A connection pipe 155 that connects an inside of the air duct 110 and an inside of the reactor containment building 11 may be provided. The connection pipe 155 may be used to release a high-pressure fluid inside of the air duct 110 into the reactor containment building 11. The releasing of the high-pressure fluid will be further described with reference to FIG. 5. The connection pipe 155 may include a valve, and the valve may correspond to a check valve. A plurality of valves may be provided. The connection pipe 155 may include a safety valve 150.

Hereinafter, an operation of the residual heat removal system according to embodiments of the present invention will be described.

Referring to FIG. 1, the heat exchanger 120 may be air-cooled by opening both ends of the air duct 110 to allow outside air to flow. A water cooling scheme may be selectively used in addition to an air cooling scheme to spray the cooling water 220 to the heat exchanger 120 through use of the cooling water supply module 200.

Figure 2:
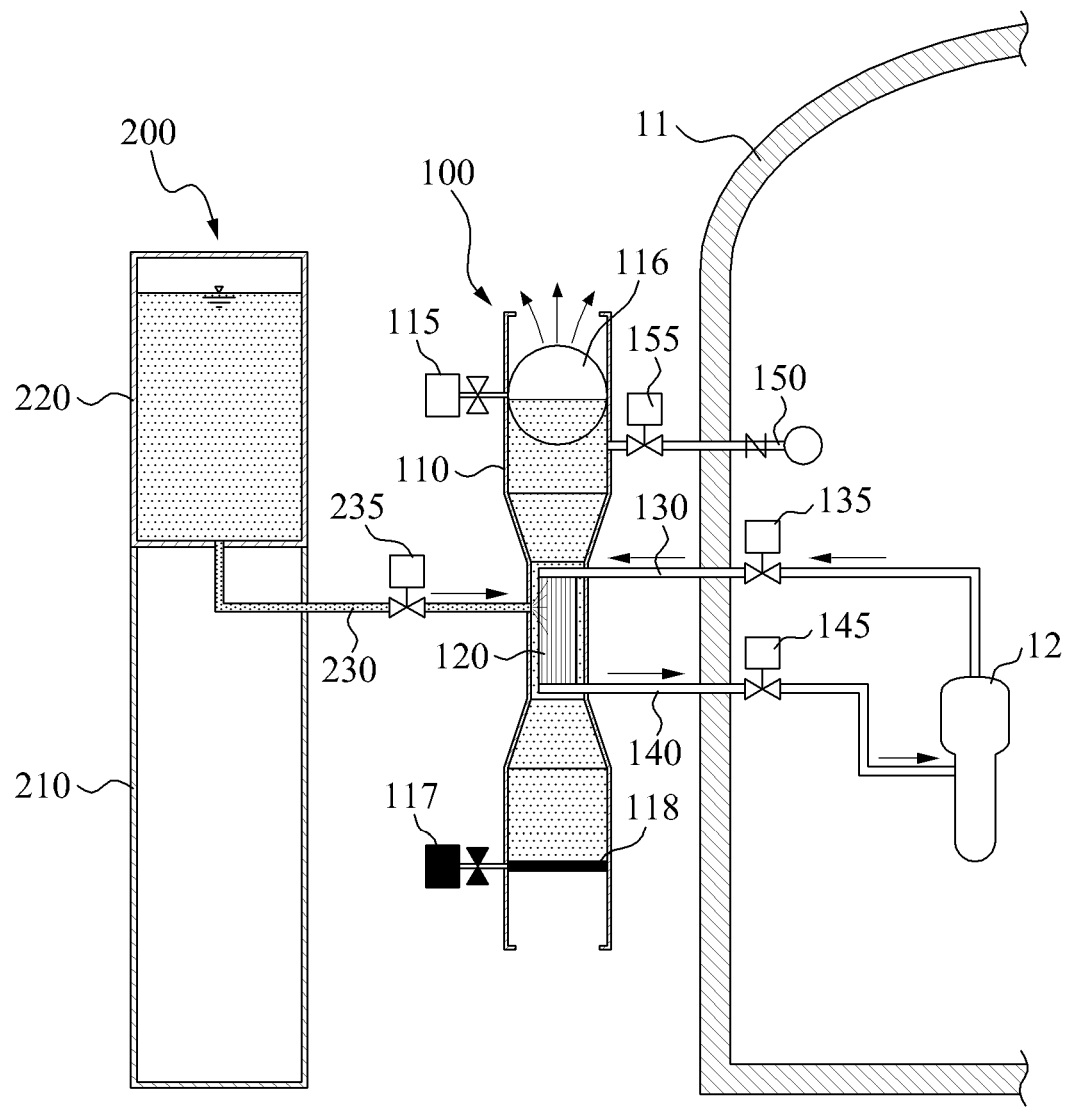
FIG. 2 illustrates a sectional view a residual heat removal system according to another embodiment of the present invention.

FIG. 2 is a diagram illustrating a residual heat removal system according to another embodiment of the present invention.

Referring to FIG. 2, the first shut-off valve 118 located at a bottom of the air duct 110 may be closed, and the cooling water 220 may be provided into the air duct 110 through use of the cooling water supply module 200. The heat exchanger 120 may be submerged in the cooling water 220, and be cooled in a water cooling scheme. In this instance, the second shut-off valve 116 may be opened so that steam of the cooling water 220 may be released.

Figure 3:
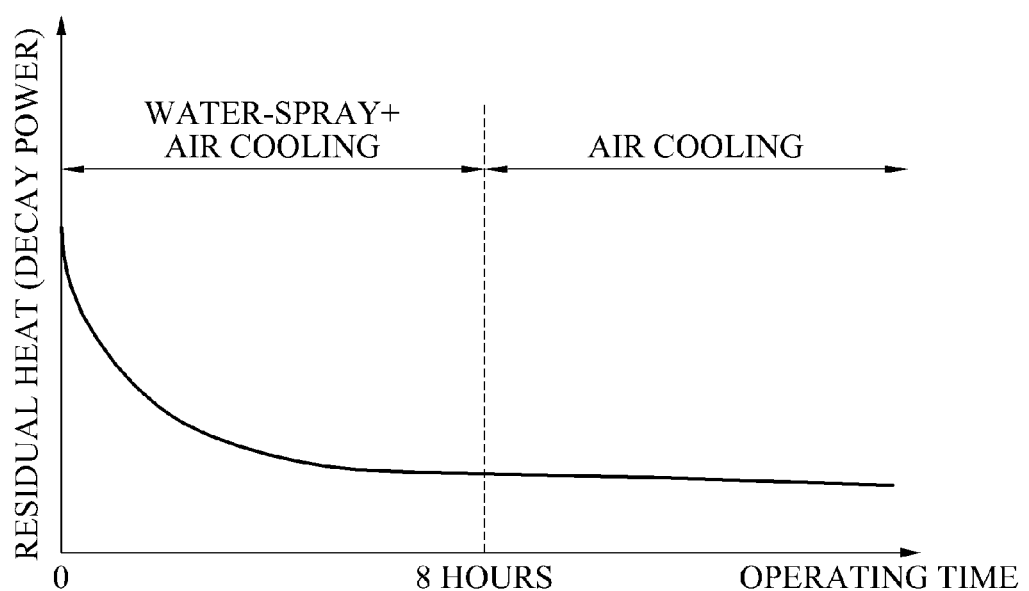
FIG. 3 is a graph illustrating a residual heat corresponding to an operating scheme according to embodiments of the present invention.

FIG. 3 is provided to describe usefulness of each cooling scheme. FIG. 3 illustrates a residual heat when a cooling scheme is converted from a water spray cooling scheme that removes a relatively large amount of heat to an air cooling scheme that removes a relatively small amount of heat. An appropriate scheme may be selected based on intent, urgency, efficiency, and the like of a cooling based on an eight hour period. A scheme of water-cooling a heat exchanger having a relatively large amount of heat removal by submerging the heat exchanger in a cooling water may be used selectively. A restriction on a cooling time may be excluded by removing heat through use of an evaporation heat of water by spraying a cooling water to a heat exchanger or in a state in which the heat exchanger is submerged in a water tank in an early phase of an accident, and being converted to an air cooling system in a late phase of the accident after eight hours from the accident initiation, that is, a residual heat level is relatively at low.

A system corresponding to a hybrid of a water-spray system and an air cooling system may be provided to greatly extend an operating time by spraying a cooling water to a heat exchanger or submerging the heat exchanger in water so that a relatively great amount of heat is removed using an evaporation heat at an early phase of a nuclear accident during which a relatively great amount of residual heat is released, and by removing a core residual heat using an air cooling at a later phase of the nuclear accident during which a supply of cooling water is exhausted or a heat load significantly decreases. By applying the system, a period of time for removing a residual heat may be extended without replenishing a supply of cooling water to a heat exchanger pool and thus, a safety system prepared in anticipation of a large natural disaster or a safety system prepared in anticipation of a Station Black Out (SBO) may be applied.

Figure 4:
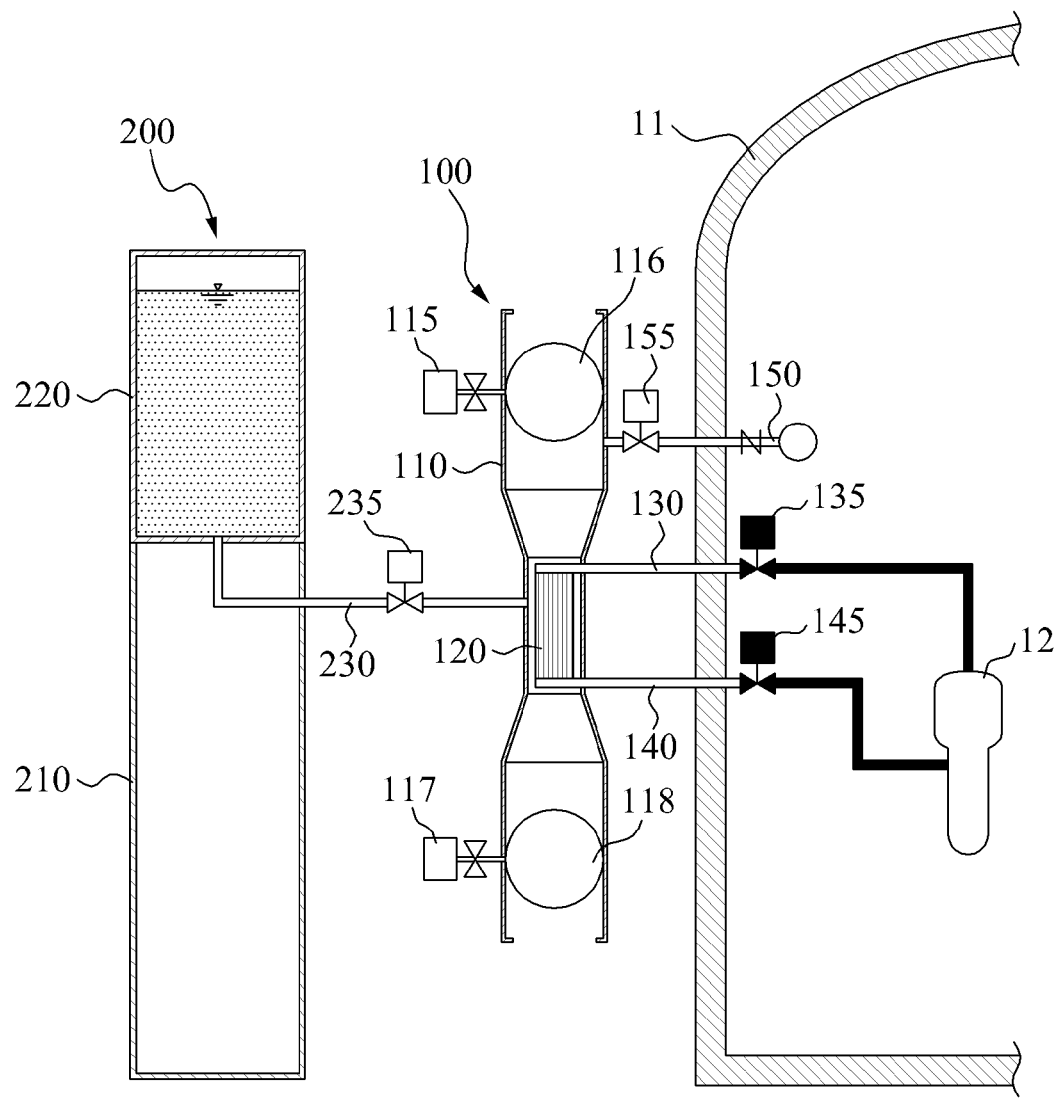
FIG. 4 illustrates a sectional view a residual heat removal system according to still another embodiment of the present invention.

FIG. 4 is a diagram illustrating a residual heat removal system according to still another embodiment of the present invention.

A flow in the first pipe 130 and the second pipe 140 may be blocked through use of the first opening and closing valve unit 135 and the second opening and closing valve unit 145 provided in the first pipe 130 and the second pipe 140. A flow of a refrigerant may be blocked in a pipe when an error occurs in the heat exchanger 120, and the like.

Figure 5:
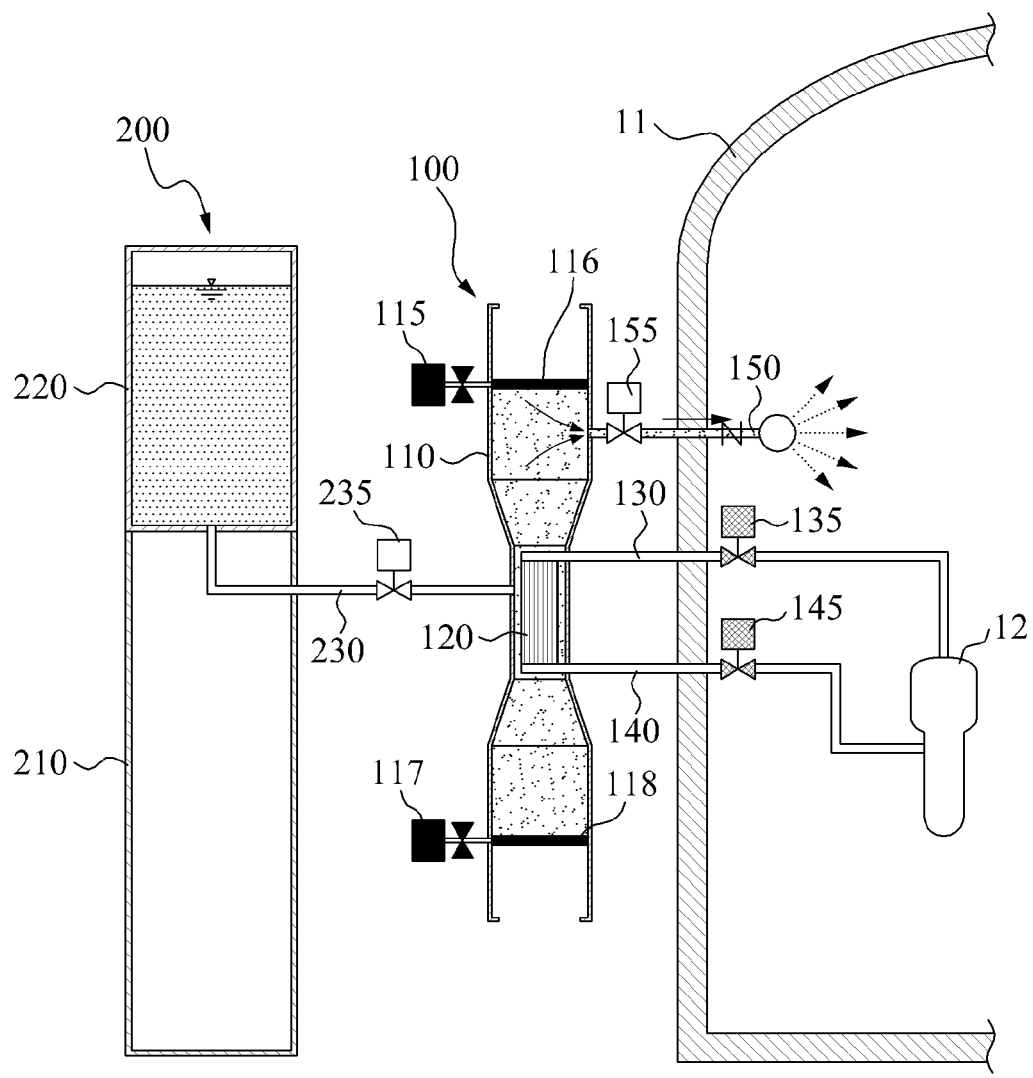
FIG. 5 illustrates a sectional view a residual heat removal system according to yet another embodiment of the present invention.

FIG. 5 is a diagram illustrating a residual heat removal system according to yet another embodiment of the present invention.

When the heat exchanger 120 is damaged, the air duct 110 may be closed using the first shut-off valve 118 and the second shut-off valve 116 provided on both sides of the air duct 110, and a linkage of a radioactive substance may be blocked by closing the first pipe 130 and the second pipe 140 through use of the first opening and closing valve unit 135 and the second opening and closing valve unit 145 provided in the first pipe 130 and the second pipe 140, respectively as illustrated in FIG. 4. The connection pipe 155 may be opened so that a high-pressure radioactive substance on an inside of the air duct 110 may flow into the reactor containment building 11. In this instance, safety may be enhanced through extension of a threshold of a pressure. That is, a check valve provided in the connection pipe 155 may operate so as to prevent a backflow of a radioactive substance from the reactor containment building 11 to the heat exchanger 120, and the safety valve 150 that opens at a lower pressure than a design pressure of the reactor containment building 11 may be provided to operate so as to prevent a linkage of a radioactive substance by releasing a pressurized radioactive substance inside of the air duct 110 into the reactor containment building 11 when a pressure of the air duct 110 increases in response to the first shut-off valve 118 and the second shut-off valve 116 at both ends of the air duct being closed.

After a spray cooling water is exhausted, the first shut-off valve 118 and the second shut-off valve 116 at a top and a bottom of the air duct 110 may be opened, thereby removing heat from the heat exchanger 120 by air naturally circulating from a top portion to a bottom portion of the air duct 110. In this instance, heat may continue to be removed without replenishing a supply of cooling water since heat released from the heat exchanger 120 may be removed without the cooling water.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A heat removal system for a nuclear power plant, the heat removal system comprising:
   an air duct provided on an outside of a reactor containment building, the air duct being configured to allow air flow of outside air therethrough and being vertical to the ground;
   a heat exchanger disposed in the air duct, the heat exchanger being constructed and positioned to be in the air flow through the air duct;
   a first pipe operatively connected to a heat source on an inside of the reactor containment building and being configured to transfer fluid heated in the reactor containment building to the heat exchanger;

a second pipe operatively connected to the interior of the reactor containment building and configured to transfer cooled fluid to the interior of the reactor containment building;

a cooling water supply module above the heat exchanger and configured to release cooling water into the air duct; and a first shut-off valve positioned in the air duct below the heat exchanger, the first shut-off valve being constructed and operable to selectively open and close the air duct below the heat exchanger, wherein the heat exchanger is configured to be alternatively at least partially cooled using outside air flowing across the heat exchanger inside of the air duct when the first shut-off valve is open, and cooled by being immersed in a cooling water supplied from the cooling water supply module when the first shut-off valve is closed.

2. A residual heat removal system for a nuclear power plant, the residual heat removal system comprising:

an air duct provided on an outside of a reactor containment building, the air duct being configured to allow air flow of outside air therethrough and being vertical to the ground;

a heat exchanger disposed in the air duct, the heat exchanger being constructed and positioned to be in the air flow through the air duct;

a first pipe operatively connected to a steam generator disposed on an inside of the reactor containment building and being configured to transfer steam generated in the steam generator to the heat exchanger; and a second pipe operatively connected to the steam generator and being configured to transfer to the steam generator condensation water that is cooled and condensed in the heat exchanger;

a cooling water supply module connected to spray a cooling water on the heat exchanger; and a first shut-off valve positioned below the heat exchanger, the first shut-off valve being constructed and operable to selectively open and close a lower end of the air duct, wherein the heat exchanger is configured to be alternatively air-cooled using outside air flowing across the heat exchanger inside of the air duct, water- and air-cooled using water sprayed on the heat exchanger and air flowing across the heat exchanger inside of the air duct, and water-cooled by being immersed in a cooling water supplied from the cooling water supply module when the first shut-off valve is closed.

3. The residual heat removal system of claim 2, wherein the cooling water supply module is located at a higher elevation when compared to the heat exchanger so as to supply the cooling water to the heat exchanger through use of a water head differential.

4. The residual heat removal system of claim 2, the cooling water supply module comprising:

a water pipe arranged to supply the cooling water; and a water pipe shut-off electric valve arranged to open and close the water pipe.

5. The residual heat removal system of claim 2, further comprising:

a second shut-off valve positioned over the heat exchanger, to selectively open and close an upper end of the air duct, wherein the first pipe and the second pipe comprise a first opening and closing valve unit and a second opening and closing valve unit to selectively open and close the first pipe and the second pipe, respectively, and the air duct being cut off from the outside air and the reactor containment building when the first shut-off valve, the second shut-off valve, the first opening and closing valve unit, and the second opening and closing valve unit are closed.

6. The residual heat removal system of claim 2, further comprising:

a connection pipe disposed between the air duct and the reactor containment building, the connection pipe comprising a check valve and a safety valve, whereby a fluid inside the air duct is released into the reactor containment building when the first shut-off valve, the second shut-off valve, the first opening and closing valve unit, and the second opening and closing valve unit are closed.

7. The residual heat removal system of claim 2, wherein the first pipe and the second pipe have a downward slope in a direction of the steam generator.

\* \* \* \* \*